United States Patent
Hashimura et al.

(10) Patent No.: US 8,877,364 B2
(45) Date of Patent: Nov. 4, 2014

(54) BATTERY PACK

(75) Inventors: Tadayoshi Hashimura, Machida (JP); Masaaki Satou, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 119 days.

(21) Appl. No.: 13/383,705

(22) PCT Filed: Jun. 18, 2010

(86) PCT No.: PCT/JP2010/004096
§ 371 (c)(1),
(2), (4) Date: Jan. 12, 2012

(87) PCT Pub. No.: WO2011/007501
PCT Pub. Date: Jan. 20, 2011

(65) Prior Publication Data
US 2012/0115000 A1    May 10, 2012

(30) Foreign Application Priority Data
Jul. 16, 2009    (JP) ................ 2009-167732

(51) Int. Cl.
*H01M 2/10* (2006.01)
*B60K 1/04* (2006.01)

(52) U.S. Cl.
CPC .......... *H01M 2/1077* (2013.01); *H01M 2/1083* (2013.01); *H01M 2/1016* (2013.01); *B60K 2001/0438* (2013.01); *B60K 1/04* (2013.01)
USPC .......................................... 429/100; 180/68.5

(58) Field of Classification Search
USPC .......................................... 429/100; 180/68.5
See application file for complete search history.

(56) References Cited

U.S. PATENT DOCUMENTS

| | | | |
|---|---|---|---|
| 3,957,056 A | 5/1976 | Comben et al. | |
| 4,725,515 A | 2/1988 | Jurca | |
| 5,783,329 A | 7/1998 | Kilb | |
| 5,789,096 A | 8/1998 | Kilb | |
| 6,380,713 B2 | 4/2002 | Namura | |
| 6,451,476 B1 * | 9/2002 | Chang et al. | 429/127 |
| 8,037,960 B2 | 10/2011 | Kiya | |
| 2009/0226806 A1 * | 9/2009 | Kiya | 429/186 |

FOREIGN PATENT DOCUMENTS

| | | |
|---|---|---|
| JP | 8-255605 A | 10/1996 |
| JP | 3199296 B2 | 6/2001 |
| JP | 2001-313017 A | 11/2001 |
| JP | 2006-80042 A | 3/2006 |
| JP | 2007-230329 A | 9/2007 |
| JP | 2008091220 A * | 4/2008 |
| RU | 2 123 742 C1 | 12/1998 |
| SU | 289463 A1 | 11/1971 |
| SU | 434521 A | 11/1974 |

* cited by examiner

*Primary Examiner* — Jonathan Jelsma
(74) *Attorney, Agent, or Firm* — Foley & Lardner LLP

(57) ABSTRACT

A battery pack including: a box main body housing a battery therein and having a box shape with an upper side opening; and a lid covering the upper side opening of the box main body. The box main body has a first seal flange formed along an outer peripheral portion of the box main body, and the lid has a second seal flange formed along an outer peripheral portion of the lid. The first and second seal flanges are in contact with each other and seal the battery pack. The first and second seal flanges are curved with a predetermined curvature.

2 Claims, 4 Drawing Sheets

BATTERY PACK

TECHNICAL FIELD

The present invention relates to a battery pack which houses a battery therein and which is mounted on an electric vehicle or the like.

BACKGROUND ART

A battery pack for housing multiple batteries is provided to an electric vehicle which travels by using a motor as a drive source. Japanese Patent No. 3199296 discloses a battery pack including a battery box and a lid, and provided under seats on which occupants are seated. The battery box is disposed on the lower side in the battery pack, and has a box shape having a closed bottom. The lid is disposed at the upper side of the battery box.

SUMMARY OF INVENTION

However, the above-mentioned battery pack has a concern that the sealing performance between the battery box and the lid may be lowered because of the following reason. Specifically, since a mating portion between the battery box and the lid in the battery pack is linear when viewed laterally, the position of the lid is likely to be laterally shifted relative to the battery box during the assembly of the battery box and the lid. As a result, a gap is formed between the battery box and the lid, resulting in the lowering of the sealing performance.

The present invention has been made in view of the above-described concern, and an object of the present invention is to provide a battery pack which enables the positional shift during the assembly to be prevented, and a high sealing performance to be maintained.

An aspect of the present invention is a battery pack including: a box main body housing a battery therein, the box main body having a box shape with an upper side opening, the box main body having a first seal flange formed along an outer peripheral portion of the box main body; and a lid covering the upper side opening of the box main body, the lid having a second seal flange formed along an outer peripheral portion of the lid, the first and second seal flanges being in contact with each other and sealing the battery pack, wherein the first and second seal flanges are curved with a predetermined curvature.

DESCRIPTION OF EMBODIMENTS

Hereinafter, a preferred embodiment of the present invention is described with reference to the drawings.

Figure 1:
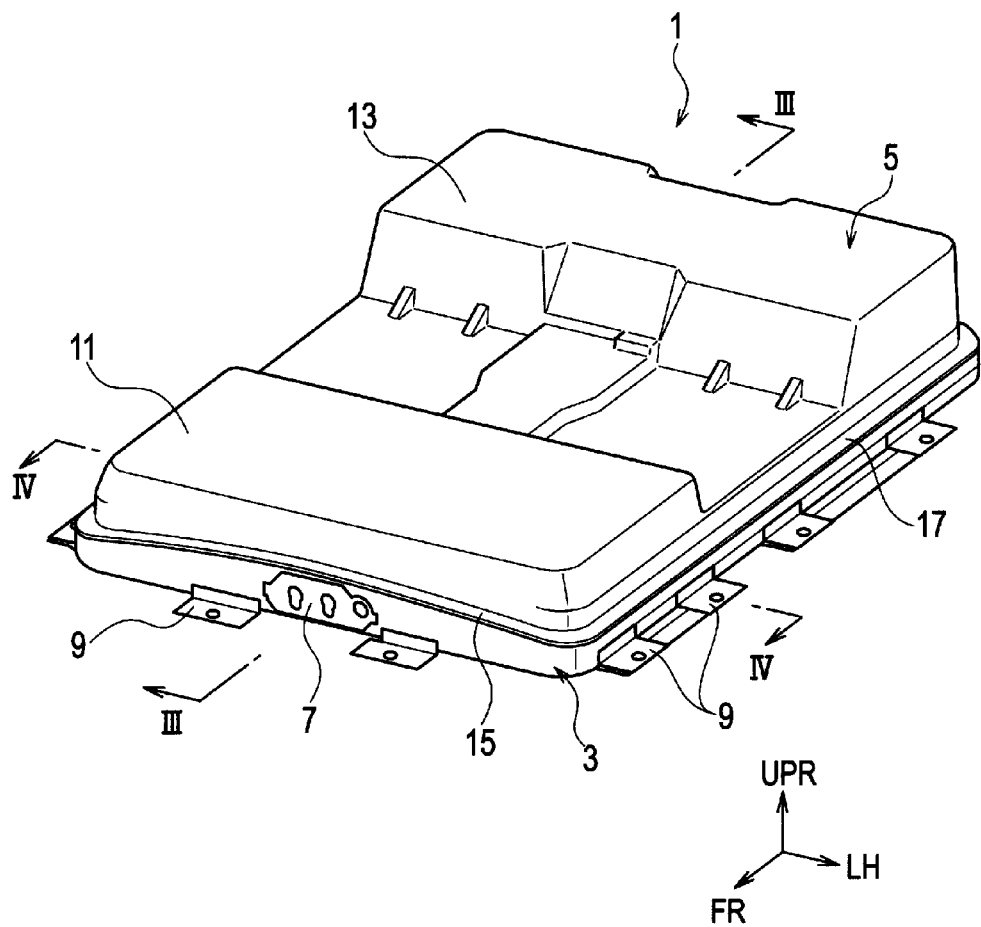
FIG. 1 is a perspective view of a battery pack according to an embodiment of the present invention.

As shown in FIG. 1, a battery pack 1 according to the embodiment of the present invention includes a box main body 3 and a lid 5. The box main body 3 has a box shape with an upper side opening and a closed bottom. The lid 5 is disposed on the box main body 3, and covers the upper side opening of the box main body 3. When the battery pack 1 is mounted on a vehicle, the box main body 3 is disposed on a lower side of the battery pack 1. Seal flanges are formed along outer peripheral portions of the upper side opening of the box main body 3 and the lower side opening of the lid 5, respectively. These seal flanges are brought into contact with each other to seal the battery pack 1.

A connector attachment bracket 7 is provided to a central portion, in a vehicle width direction, of a front surface of the box main body 3. Attachment brackets 9 are attached to the front surface of the box main body 3 respectively at outer sides, in the vehicle width direction, of the connector attachment bracket 7. With the attachment brackets 9, the battery pack 1 is supported on a vehicle body member such as a side member 29 (refer to FIG. 4). Moreover, for example, four attachment brackets 9 are attached to each of right and left side surfaces of the box main body 3.

The lid 5 has a first convex portion 11 and a second convex portion 13. The first convex portion 11 is disposed on a front side in a vehicle front-rear direction, and bulged upward. The second convex portion 13 is disposed on a rear side in the vehicle front-rear direction, and bulged upward. These first convex portion 11 and second convex portion 13 are arranged away from each other in the front-rear direction with a predetermined distance therebetween.

Moreover, the seal flange along the outer peripheral portion of the substantially rectangular lower side opening of the lid 5 is formed of a front seal flange 15, a rear seal flange (not shown), and a pair of side seal flanges 17, which are integrated with each other. The front seal flange 15 is disposed on a front side in the vehicle front-rear direction, and extends in the vehicle width direction. The rear seal flange is disposed on a rear side in the vehicle front-rear direction, and extends in the vehicle width direction. The side seal flanges 17 are disposed on outer sides in the vehicle width direction, and extend in the vehicle front-rear direction. Each side seal flange 17 is joined to the front seal flange 15 and the rear seal flange at both edges, in the vehicle front-rear direction, of the side seal flange 17, such that the side seal flange 17 is continuous to the front seal flange 15 and the rear seal flange at both edges.

Moreover, the seal flange along the outer peripheral portion of the substantially rectangular upper side opening of the box main body 3 is formed of a front seal flange 31 (refer to FIG. 3), a rear seal flange (not shown), and a pair of side seal flanges 33 (refer to FIG. 4), which are integrated with each other. The front seal flange 31 is disposed on the front side in the vehicle front-rear direction, and extends in the vehicle width direction. The rear seal flange is disposed on the rear side in the vehicle front-rear direction, and extends in the vehicle width direction. The side seal flanges 33 are disposed on the outer sides in the vehicle width direction, and extend in the vehicle front-rear direction. Each side seal flange 33 is joined to the front seal flange 31 and the rear seal flange, at both edges, in the vehicle front-rear direction, of the side seal flange 33, such that the side seal flange 33 is continuous to the front seal flange 31 and the rear seal flange, at both edges.

Figure 2:
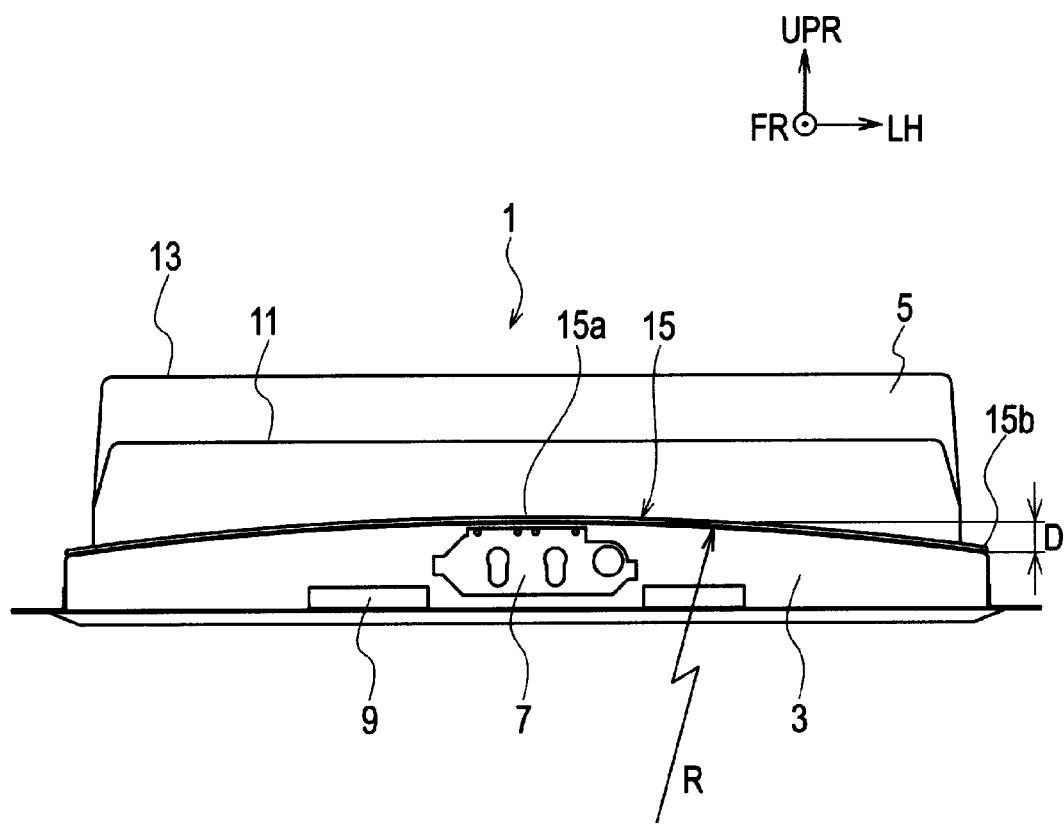
FIG. 2 is a front view of the battery pack of FIG. 1.

In this embodiment, the front seal flanges 15 and 31 of the box main body 3 and the lid 5 are curved in a vertical direction, so that the front seal flanges 15 and 31 are in an arc shape and convex upward as the battery pack 1 is disposed with the lid 5 being on the upper side and the box main body 3 being on the lower side as shown in FIG. 2. Specifically, the front seal flange 15 of the lid 5 is curved in the vertical direction with a predetermined radius of curvature R so as to be highest at a central portion 15a in the vehicle width direction, and to be lowest at both left and right edge portions 15b at the same level. Meanwhile, the front seal flange 31 of the box main body 3 is curved in a vertical direction so as to be convex upward along the curved surface of the front seal flange 15 of the lid 5. Note that the difference in height between the central portion 15a of the front seal flange 15 and the both left and right edge portions 15b thereof is set to a distance D. The distance D may be adjusted according to the application, but may preferably be within a range from about one-hundredth to about one-tenth the width of the battery pack 1, and may more preferably be within a range from about one-fiftieth to about one-thirtieth the width of the battery pack 1.

In FIGS. 1 and 2, curved are the front seal flanges 15 and 31 to be located on the front side in the vehicle front-rear direction in a state where the battery pack 1 is mounted on a vehicle. In this embodiment, also on the rear side (not shown) in the vehicle front-rear direction, the rear seal flanges of the box main body 3 and the lid 5 are curved in the vertical direction so as to be convex upward, as similar to the front seal flanges 15 and 31.

Moreover, a surface of each side seal flange 17 of the lid 5 is inclined in such a manner that the height of the surface is gradually reduced toward the outer sides in the vehicle width direction so that the surface of the side seal flange 17 can be smoothly continuous to the front seal flange 15 of the lid 5 and to the rear seal flange thereof. Likewise, the surface of each side seal flange 33 of the box main body 3 is inclined in such a manner that the height of the surface is gradually reduced toward the outer sides in the vehicle width direction so that the surface of the side seal flange 33 can be smoothly continuous to the front seal flange 31 and the rear seal flange.

Note that, in the battery pack 1, the side seal flanges 17 and 33 extend substantially linearly in the vehicle front-rear direction, the side seal flanges 17 and 33 being located on the outer sides in the vehicle width direction in a state where the battery pack 1 is mounted on a vehicle. As a result, a high shock absorption performance can be maintained at the time of collision of a vehicle.

Figure 3:
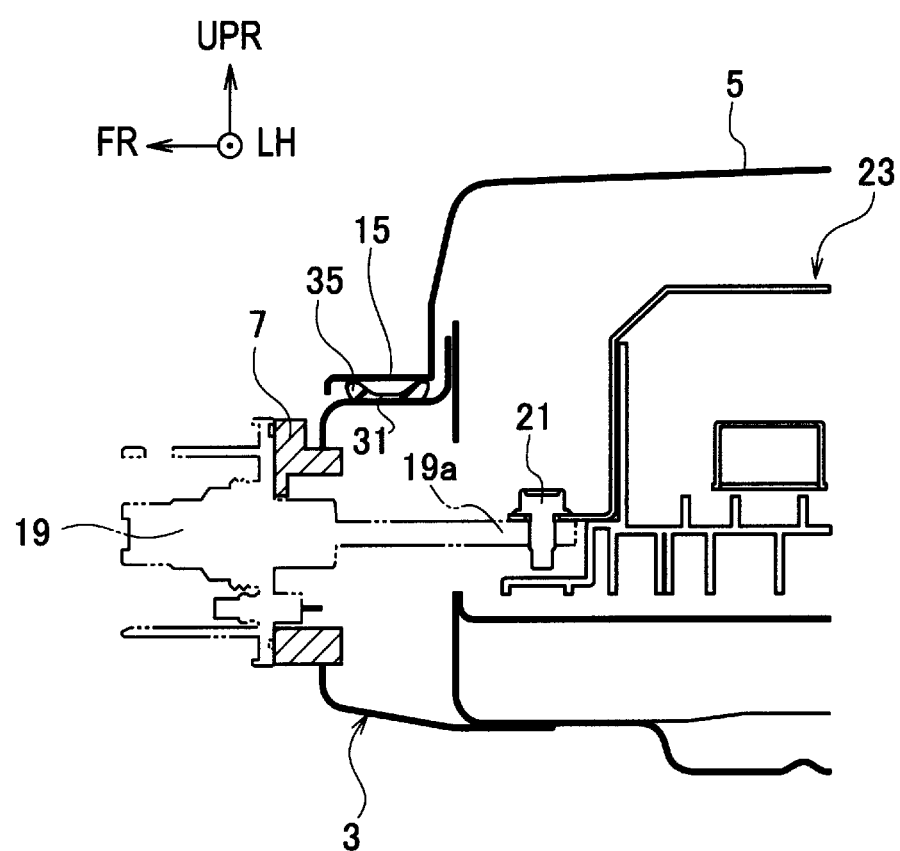
FIG. 3 is a cross-sectional view taken along the III-III line of FIG. 1.

As shown in FIG. 3, a connector 19 is attached to the connector attachment bracket 7, the connector 19 being for, for example, a high voltage harness to which a motor or an inverter is connected. A rear edge portion 19a of the connector 19 protrudes inside the battery pack 1, and is fastened to an auxiliary unit 23 with a support bolt 21. The front seal flange 15 of the lid 5 and the front seal flange 31 of the box main body 3 are sealed with a rubber sealing member 35 interposed therebetween.

Figure 4:
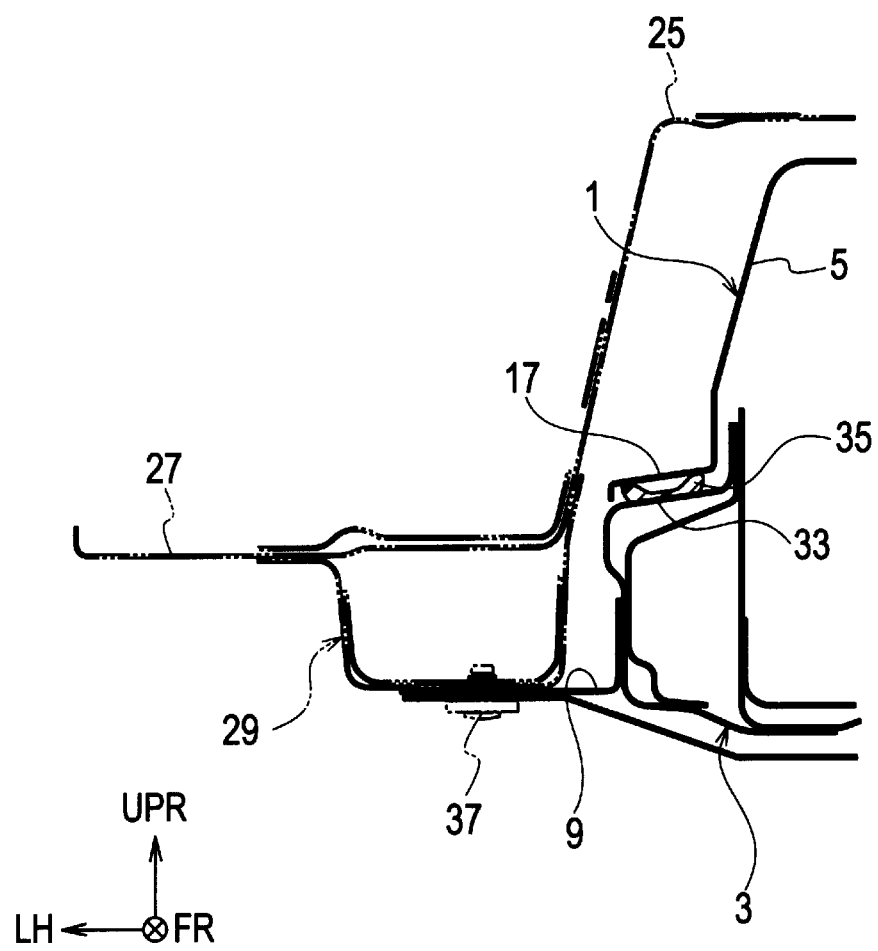
FIG. 4 is a cross-sectional view taken along the IV-IV line of FIG. 1.

As shown by the long dashed double-dotted line in FIG. 4, a flange 27 extends outward in the vehicle width direction (leftward in FIG. 4), while protruding from a left edge portion of a floor panel 25. The side member 29 having a closed cross-sectional shape is provided under the flange 27.

As described above, the attachment brackets 9 protruding outward in the vehicle width direction are provided to lower portions of both side surfaces of the battery pack 1 on outer sides in the vehicle width direction. Each of the attachment brackets 9 is fastened to a bottom surface of the side member 29 with a bolt 37. Moreover, the side seal flanges 17 of the lid 5 and the side seal flanges 33 of the box main body 3 are sealed with the rubber sealing member 35 interposed therebetween.

The battery pack 1 according to the embodiment of the present invention includes the box main body 3 which houses batteries therein and which has the box shape with the closed bottom, and the lid 5 which covers the upper side opening of the box main body 3. The seal flange including the front seal flange 15, the rear seal flange, and the side seal flanges 17 is formed along the outer peripheral portion of the box main body, while the seal flange including the front seal flange 31, the rear seal flange, and the side seal flanges 33 is formed along the outer peripheral portion of the lid 5. These seal flanges are brought into contact with each other to provide the sealing therebetween. The front seal flanges 15 and 31 and the rear seal flanges of the box main body 3 and of the lid 5 are curved with the predetermined radius of curvature R. Accordingly, when the seal flange of the lid 5 is placed on the seal flange of the box main body 3 for assembly with the sealing member 35 interposed therebetween, the lateral position shift of the lid 5 relative to the box main body 3 is prevented. As a result, a gap is less likely formed between the seal flanges, whereby a high sealing performance can be maintained.

Moreover, in the battery pack 1, the front seal flanges 15 and 31 and the rear seal flanges of the box main body 3 and of the lid 5 are curved so as to be convex upward when the battery pack 1 is disposed with the lid 5 being on the upper side and the box main body 3 being the lower side. For this reason, when a vehicle is driven with the battery pack 1 being mounted on a vehicle body, mud, water, and the like splashed from the road efficiently slide or flow downward along upper surfaces of the seal flanges.

In the battery pack 1 according to this embodiment, the seal flanges curved to be convex upward are provided on both the front and rear sides in the vehicle front-rear direction. However, a battery pack may have a structure in which a seal flange curved as described above is disposed on any one of the front and rear sides in the vehicle front-rear direction. Here, suppose a case where a connector attachment bracket to which a connector for a high voltage harness is connected is provided on a front surface of a box main body of a battery pack. In such a case, when seal flanges curved to be convex upward are provided on a front side, in the vehicle front-rear direction, of the battery pack, the sealing performance for the attachment portion to which the high voltage harness is attached is further improved because of the following reason. Specifically, during the driving of a vehicle, even when mud, water, and the like on the road are splashed in a direction from the front side to the rear side onto an upper surface of the seal flanges, the mud, water, and the like effectively slide or flow down toward the both sides in the vehicle width direction. Note that when parts for which a high sealing performance is provided exist only on a rear surface of a box main body of a battery pack, it is also possible to provide a seal flange curved to be convex upward only on a rear side, in the vehicle front-rear direction, of the battery pack.

The present disclosure relates to subject matters contained in Japanese Patent Application No. 2009-167732, filed on Jul. 16, 2009, the disclosures of which is expressly incorporated herein by reference in its entirety.

Industrial Applicability

The battery pack according to the present invention makes it possible to prevent a lateral shift of the lid relative to the box main body otherwise occurring when the seal flange of the lid is mounted on the seal flange of the box main body for assembly. Thereby, a gap is less likely formed between the seal flanges, and a high sealing performance can be maintained. Accordingly, the battery pack of the present invention is industrially applicable.

The invention claimed is:

1. A battery pack comprising:
a box main body housing a battery therein, the box main body having an upper side opening, the box main body having a first seal flange formed along an outer peripheral portion of the box main body, the first seal flange extending in an extending direction along the outer peripheral portion of the box main body; and a lid covering the upper side opening of the box main body, the lid having a second seal flange formed along an outer peripheral portion of the lid, the second seal flange extending in the extending direction, the first and second seal flanges being in contact with each other and sealing the battery pack, wherein the first and second seal flanges are formed to have mating curved surfaces curved with a predetermined curvature in a cross section along the extending direction and mating with each other, wherein one of the mating curved surfaces is convex and the other of the mating curved surfaces is concave, wherein the first and second seal flanges are curved in such a manner that the first and second seal flanges are convex upward when the battery pack is mounted on a vehicle with the lid being on an upper side and the box main body being on a lower side, the first seal having a highest point at a central portion of the first seal flange and a lowest point at edge portions of the first seal flange.

2. The battery pack according to claim 1, wherein the battery pack is mounted on the vehicle with the curved seal flanges being disposed on at least one of a front side and a rear side, in a vehicle front-rear direction, of the battery pack.

* * * * *